United States Patent [19]

Hudson

[11] 4,389,367
[45] Jun. 21, 1983

[54] FLUID MOLDING SYSTEM

[75] Inventor: Gordon F. Hudson, Huntington, N.Y.

[73] Assignee: Grumman Aerospace Corporation, Bethpage, N.Y.

[21] Appl. No.: 306,948

[22] Filed: Sep. 30, 1981

[51] Int. Cl.³ .............................................. B29C 1/06
[52] U.S. Cl. .................................... 264/570; 264/102; 364/221; 264/314; 264/512; 264/571; 425/144; 425/149; 425/176; 425/225; 425/226; 425/227; 425/405 H; 425/405 R; 425/542
[58] Field of Search ............... 425/144, 149, 176, 225, 425/226, 227, 405 H, 405 R, 542; 264/102, 221, 314, 371, 512, 570, 571

[56] References Cited

U.S. PATENT DOCUMENTS

| | | | |
|---|---|---|---|
| 1,523,519 | 1/1925 | Gibbons | 264/317 |
| 1,554,697 | 9/1925 | Alden | 264/317 |
| 2,217,743 | 10/1940 | Greenewalt | 425/449 |
| 2,608,720 | 9/1952 | Meissner | 425/111 |
| 2,739,350 | 3/1956 | Lampman | 264/313 |
| 4,056,596 | 11/1977 | Pahl | 264/166 |

Primary Examiner—Maurice J. Welsh
Attorney, Agent, or Firm—John P. Kozma; Richard G. Geib; Daniel J. Tick

[57] ABSTRACT

An apparatus and method for forming components having one or more inner cavities wherein material forming the component is laid up about a number of eutectic salt mandrels corresponding to the inner cavities. The mandrels are melted and the laid up material compressed during the formation of the component by hydraulic pressure transmitted through the molten mandrels.

31 Claims, 6 Drawing Figures

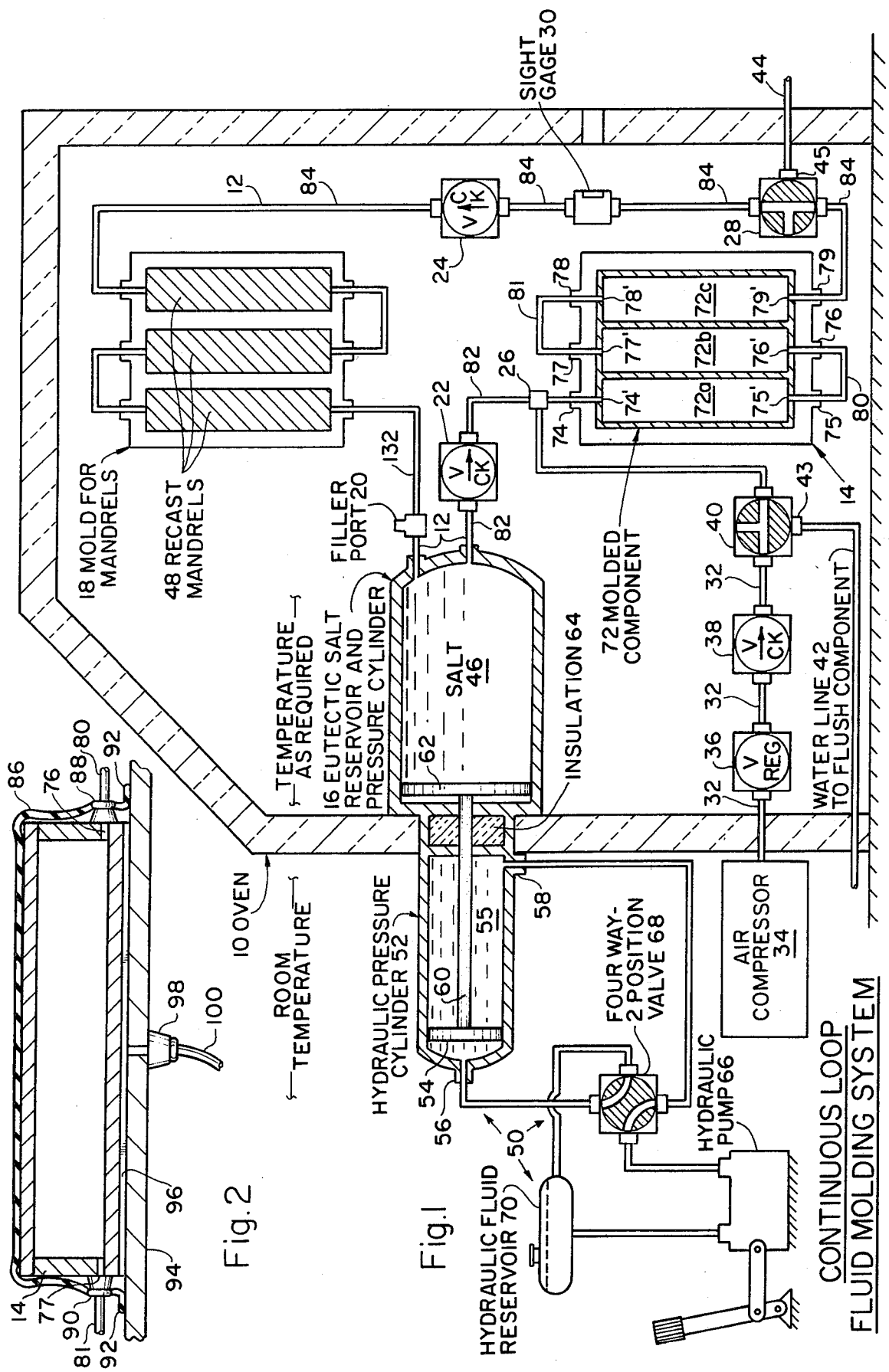

FLUID MOLDING SYSTEM

BACKGROUND OF THE INVENTION

The present invention relates to the formation of hollow molded components, particularly by means of an apparatus in which uncured thermosetting material is laid up about one or more meltable mandrels formed from eutectic salts.

Destructable molds made from low melting point, or eutectic, salts are known in the art. For example, U.S. Pat. No. 1,523,519, issued to Gibbons, addresses the suitability of various combinations of salts for use as mold forms for rubber tires and other vulcanized articles. U.S. Pat. No. 1,554,697, issued to Alden, teaches the use of salt cores in the manufacture of hollow articles, which cores may be extracted from the molded article by dissolving the salt with water after completion of the molding process. Other methods of removing the core or interior mold, namely by breaking or melting same are discussed in U.S. Pat. No. 2,217,743, issued to Dreyfus.

Several advantages are realized by the foregoing schemes. Eutectic salt cores or mandrels may readily be cast in rather fine detail, allowing ample flexibility in the design of articles to be molded therefrom. Furthermore, the ease with which new cores may be recast from the melted, broken or dissolved material of previously used cores lends a desirable economy to the overall operation.

With regard to the use of salt cores to form discrete, non-continuous hollow articles, however, one problem which has not been satisfactorily solved to date is the removal of the core from the finished article. Dissolving the core as in Adler is objectionable because it is time consuming. Hollow, frangible cores, as suggested by Dreyfus, may be more readily extracted, but are costlier and more difficult to produce than solid cores. Solid cores may be melted, but must then be drained by gravity. Regardless of what method of extraction is used, recasting has required collecting and repouring the used salt to form new mandrels, thus interrupting the continuity of the process.

An apparatus for shaping and laminating thermoplastic sheets which includes means for continuously recycling the eutectic salt used in the process is shown in U.S. Pat. No. 2,608,720, issued to Meisner. U.S. Pat. No. 4,056,596, issued to Pahl, discloses another continuous scheme wherein tubing is formed about a hollow mandrel which may be melted by an induction coil or broken up by ultrasonic waves and forced back through the mandrel by compressed air. Neither Meissner nor Pahl, however, is adaptable to recycling mandrels used in forming discrete, non-continuous hollow articles, their utility being limited respectively to the formation of continuous sheets and tubes.

A further objection to present techniques is the lack of control over the compression of the material to be molded. The formation of high strength laminates having a thermosetting resin matrix depends on the uniform exertion of a precisely controlled pressure during the molding or curing process. In the prior art, layers of thermosetting material wrapped about a salt core and placed in a rigid outer die for curing were compressed almost exclusively by the expansion of the salt core due to heating to cure temperature. If instead of a rigid outer die, the uncured component is enclosed in a vacuum bag which is in turn placed in an autoclave, the surfaces exposed to the vacuum bag will usually be compacted sufficiently by the autoclave pressure to be free of voids due to air bubbles, but the inner surfaces must still rely on thermal expansion of the mandrels. Because the manufacturing tolerances of the mandrels, the thickness variation of the uncured material, and the manufacturing tolerance of the outer die, the final fit of the uncured component into the outer die will be difficult to control. This dimensional variation will have a direct effect on the pressure exerted by the thermally expanded mandrels on the component at cure temperature, which, in turn, will determine the strength and quality of a part.

U.S. Pat. No. 2,739,350, issued to Lampman, discloses a reusable, thermoplastic inner mold which may be easily withdrawn from the molded article after completion of the molding process but before the mold cools to a rigid state. The mold includes an inner cavity which is pressurized during the molding operation, resulting in compression of the material to be molded against a rigid outer die. Still, however, a precisely controllable, uniform pressure cannot be applied using the Lampman inner mold because the pneumatic pressure must be transmitted through a rather thick layer of viscous thermoplastic. Another objection to the Lampman method is that the opening to the interior cavity of the article to be molded must be at least nearly as wide as the cavity itself. Furthermore, the cavity must not include any sharp recesses transverse to the direction of removal of the inner mold, thus limiting the shapes which may be formed by the Lampman process.

SUMMARY OF THE INVENTION

A principal object of the present invention is to provide a molding apparatus with which one may apply a controlled, uniform pressure to the interior surface of a hollow component to be cured.

It is further desired, according to this invention, to supply such a molding apparatus wherein the material to be molded is laid up about one or more meltable mandrels formed from eutectic salts, the outer contours of said mandrels conforming to a desired inner contour of the articles to be molded.

Yet another object of this invention is to furnish a molding apparatus, of the type employing eutectic salt mandrels, with means for automatically controlling the curing cycle, the extraction of used mandrels from the molded component, and the recasting of new mandrels.

A still further object of the present invention is to furnish a molding apparatus with a molding fixture adaptable for use with either a rigid outer die or a flexible vacuum bag.

It is yet another object of this invention to provide a molding apparatus employing eutectic salt mandrels with means by which the used mandrels may be quickly and completely extracted from the molded article upon completion of the molding process.

One still further object of the present invention is to provide a molding apparatus employing eutectic salt mandrels with means by which the mandrels may be accurately recast in a hot mold to avoid the problems of chilling and shrinkage.

The foregoing and other objects and advantages are realized, in brief, by the provision of a molding apparatus having a curing oven in which are enclosed a eutectic salt reservoir, a molding fixture and an appropriate die or dies for recasting eutectic salt mandrels. Pressurizing means are included which may be operated when the eutectic salt is in a molten state to control the hydraulic pressure within the reservoir. A hydraulic check valve allows this pressure to be directed to the molding fixture which contains the article to be cured, thus transmitting a uniform, controllable pressure to the article's interior surface.

Removal of the mandrel is achieved with the salt in molten state, and may be commenced once the article being cured has set or reached the gel state. A valve directing pneumatic pressure to the molding fixture is opened, and a second valve interposed along a line from the molding fixture to the mandrel recast dies is opened. Air pressure thus forces the molten mandrels flow from the molding fixture to the recast dies.

When the mandrel dies have been fully replenished, the oven temperature is reduced to below the melting point of the eutectic salt. Upon solidification of the mandrels, the molding fixture and mandrel dies are opened and the cured component and recast mandrels removed, where upon the molding process may be repeated.

BRIEF DESCRIPTION OF THE DRAWINGS

The foregoing and other objects and advantages of the present invention are more fully explained in the following detailed description, a better understanding of which may be gained by reference to the drawings in which;

FIG. 1 is a schematic drawing of a fluid molding system according to the present invention;

FIG. 2 is a cross section view of a molding fixture enclosed by a vacuum bag;

DETAILED DESCRIPTION OF PREFERRED EMBODIMENTS

A. Construction

Figure 3:
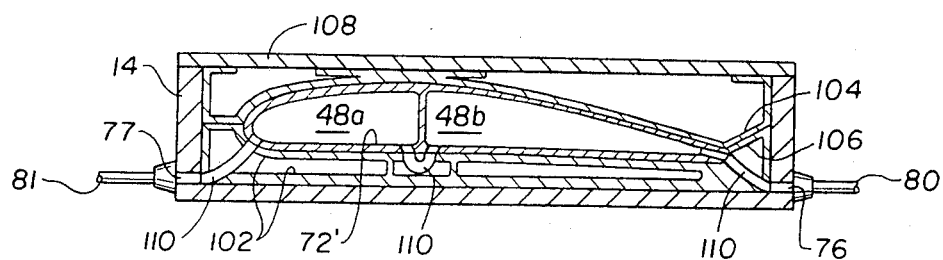
FIG. 3 is a cross section of a molding fixture enclosing a rigid outer die.

Referring to FIG. 1, the novel features of an apparatus embodying the present invention are shown schematically. An oven 10 encloses a fluid loop 12 along which are interposed three major elements—a molding fixture 14, a reservoir 16 and recast dies 18. Also interposed along loop 12 are a filler port 20, hydraulic check valves 22 and 24, a T fitting 26, a three-way two-position valve 28 and a window flow gauge 30.

An auxilliary line 32 connects T fitting 26 to air compressor 34 located externally of oven 10. Interposed along line 32 are a pneumatic regulator valve 36, a hydraulic check valve 38 and a three-way, two-position valve 40. A flush line 42 is connected to the third inlet 43 of valve 40, while a drain line 44 is connected to the third inlet 45 of valve 28.

Figure 6:
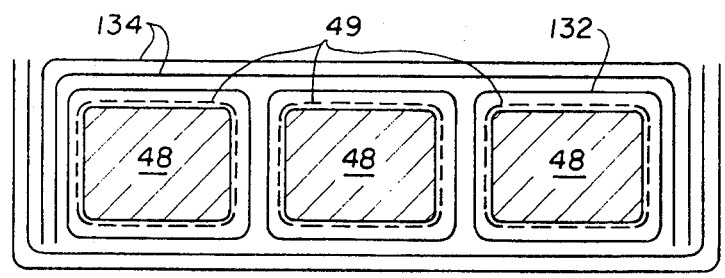
FIG. 6 is a cross section view of a laid up component prior to curing.

A quantity of eutectic salt 46 is partly contained in fixture 14 (during the formation of a component) or in the recast dies 18 (during the post-cure cycle) in the form of a number of molding cores or mandrels 48. The mandrels may also include an outer layer 49 of inert material, such as Teflon or Kapton (FIG. 6). Eutectic, or low melting point, salts are well known, and those skilled in the art would weigh a number of factors such as melting point, solubility, thermal expansion, etc., in selecting a particular salt in connection with this invention.

In general, eutectic salt 46 exists in either a solid or a molten state depending on its temperature and, in its molten state, is characterized by fluid properties. Thus, when compressed, molten eutectic salt 46 will exhibit a uniform hydraulic pressure over a containing surface, and may be forced to flow through fluid loop 12 in the direction of check valves 22 and 24.

Compression means 50, located externally of oven 10, are arranged so as to allow control of the hydraulic pressure of molten eutectic salt 46 contained in reservoir 16. Such means may include a hydraulic pressure cylinder 52 with a plunger 54 responsive to hydraulic fluid 55 entering fluid ports 56 and 58. A rod 60 may be used to connect plunger 54 to a second plunger 62 in the reservoir. Insulation 64 prevents heat from oven 10 from affecting hydraulic fluid 55. Compression is controlled by a hydraulic pump 66 and a four-way, two-position valve 68 which are connected to a hydraulic fluid reservoir 70.

A component 72 is contained within molding fixture 14 during formation. By way of example, component 72 in FIG. 1 includes three inner cavities, 72a, 72b and 72c. According to one aspect of this invention, each inner cavity of a component in place within the molding fixture must be in fluid communication with the reservoir. According to a further aspect of the invention, each inner cavity of a component in place within the molding fixture must not only be in communication with the reservoir, but must itself be part of the fluid loop. That is, there must be a fluid path through each inner cavity from the reservoir to the recast dies.

The molding fixture 14 of FIG. 1 provides a series path through inner cavities 72a, 72b, and 72c of component 72 by means of fluid inlet port 74 connected to reservoir 16 by portion 82 of fluid loop 12, intermediate ports 75–78 and fluid outlet port 79 in registry with openings 74' and 75'; 76' and 77'; and 78' and 79' in cavities 72a, 72b and 72c respectively. Ports 75 and 76 are connected by intermediate line 80, while ports 77 and 78 are similarly connected by intermediate line 81 and outlet port 79 is fluidly connected to the recast dies 18 by portion 84 of the loop.

Recast dies 18 are equal in number to and shaped accordingly with the mandrels. As with the inner cavities of component 72 enclosed in molding fixture 14, the recast dies are interconnected such that a fluid path may be traced through each recast die from the molding fixture back to the reservoir.

The foregoing scheme of ports and interconnections is only representative of the possible embodiments of the present invention. Numerous variations will be obvious. For instance, a parallel fluid path may be implemented by inserting four-way fittings at the inlet and outlet ports and replacing lines 80 and 81 with appropriate connections, or the flow in cavity 72b may be reversed by switching the connections of lines 80 and 81 to ports 76 and 77. Or, for a two cavity component, ports 76 and 77 maybe blocked, and lines 80 and 81 replaced by a single interconnecting line between ports 75 and 78.

For most changes in the configuration of a component, further adjustments beyond rearranging the interconnecting lines will be necessary. To form a component with more than three parallel cavities using the six port molding fixture 14 of FIG. 1 for instance, adapter plates may be inserted into the molding fixture between the fluid ports and the ends of the component. Adjacent to the component thin plates having holes in registry with the openings to each inner cavity would be used. Thicker plates having slots to provide fluid channels between holes in the thin plates and the fluid ports would be inserted between the thin plates and the molding fixture. Such adapter plates could be used to provide serial or parallel flow according to the arrangement of slots on the slotted plates.

FIG. 2 shows a cross sectional view of molding fixture 14 enclosed by an external vacuum bag 86. Included on vacuum bag 86 are airtight grommets 88 and 90 in registry with ports 76 and 77. Similar grommets provide airtight seals around ports 74, 75, 78 and 79. A lip 92 of vacuum bag 86 provides a vacuum seal against table 94 which supports the molding fixture. Suitable means may be provided to evacuate bag 86, such as grooves 96 in the underside of molding fixture 14, fitting 98 on the underside of table 92 in communication with grooves 96, and vacuum line 100 connected to fitting 98.

To facilitate the formation of complex components, a modified molding fixture having an irregularly shaped molding surface may be used. Alternatively, rigid adaptor plates or outer dies having a shape conformed to a desired outer shape of the component may be inserted into molding fixture 14. In general, any complex outer die with plural displaceable individual portions may be adapted to the present invention by providing said die with holes in registry with the openings in the component, appropriate internal lines for interconnecting the holes in the die with the fluid ports in the molding fixture and adequate structure to hold the die in position in the fixture.

In FIG. 3, molding fixture 14 is shown in cross section with a rigid die 102 providing a molding surface for a reinforced airfoil component 72'. Die 102 comprises mutually displaceable portions 104 and 106 which may be separated to remove the cured component by lifting cover 108 from the molding fixture. As shown, two mandrels 48a and 48b lie in the fluid loop between ports 76 and 77, and die 102 includes internal lines 110 which interconnect the mandrels and the ports in the molding fixtures. Internal lines 110 are arranged so that molten salt flowing through airfoil component 72' exits each cavity at its lowest point. Thus, to insure "downward" flow between ports 76 and 77, i.e., flow parallel to that between ports 74 and 75 and between ports 78 and 79, the connections to ports 76 and 77 should be reversed from FIG. 1 by having interconnecting lines 80 and 81 connect port 76 to port 78 and port 77 to 75, as described above.

Figure 4:
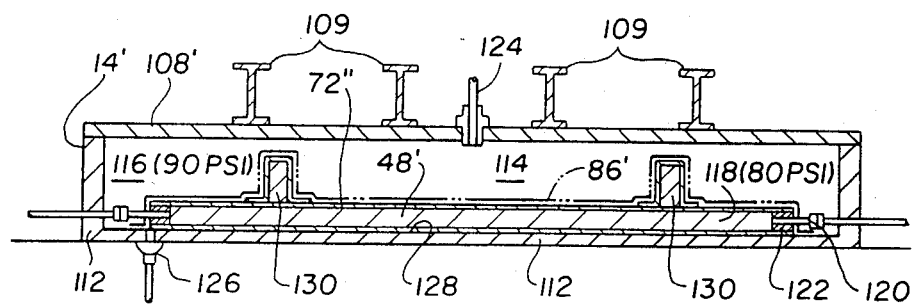
FIG. 4 is a cross section of a molding fixture with an enclosed vacuum bag.
Figure 5:
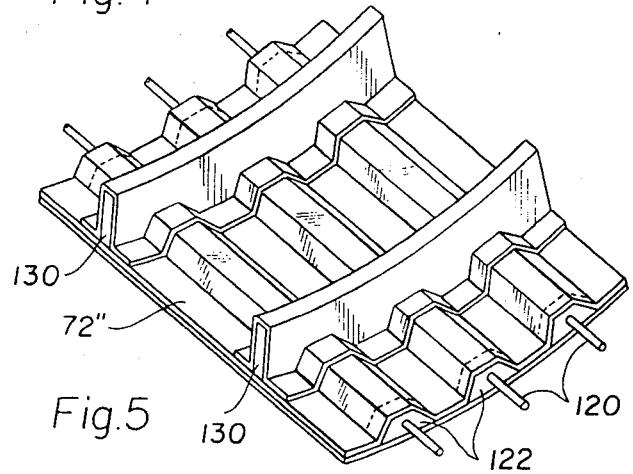
FIG. 5 is an isometric view of a multi-reinforced component.

A modified molding fixture 14' (FIG. 4) having an enclosed vacuum bag 86' may be used to form complex, multi-reinforced structures such as component 72'' (FIG. 5). Fixture 14' includes a rigid outer wall 112 with removeable cover 108' which may be assembled to define an airtight chamber 114. Cover 108' is held in place as by braces 109 to enable pressurization of chamber 114. Vacuum bag 86' divides chamber 114 into a pressure chamber 116 and a vacuum chamber 118 in which the component 72'' is contained during formation. Extension lines 120 mounted in end plugs 122 serve to fluidly connect the vacuum chamber to the fluid ports in the molding fixture.

The pressure chamber 116 may be pressurized by means of a pneumatic valve or fitting 124 mounted in cover 108' while the vacuum chamber 118 may be evacuated by means of fitting 126 in the bottom wall of the molding fixture. A molding surface within the fixture is provided by lower surface 128 against which vacuum bag 86' is sealed. Salt mandrels 48' communicate with fluid loop 12, while forms 130 are segregated and removable after the cured component has been removed from the molding fixture. Forms 130 may be formed from eutectic salt, but are preferably made of a rigid material such as aluminum or Teflon.

B. Operation

FIG. 6 illustrates the lay-up of component 72 of FIG. 1. Mandrels 48, as formed in recast dies 18, are prepared by wrapping each with a layer of inert material, 49 such as Teflon or Kapton to prevent the molten eutectic salt 46 from permeating the component 72 during formation. The number of mandrels equals the number of inner cavities in the component to be formed, and each mandrel has a shape corresponding to a desired shape of its associated inner cavity.

A desired thickness of material from which the component is to be formed is then laid up about the wrapped mandrels 48. The lay up procedure may comprise wrapping layers of material 132 about the individual mandrels, then draping additional layers of material 134 over the mandrels as they are fitted together to form the component.

With regard to the type of material forming the component, the present invention finds its greatest utility in the formation of high strength laminited components. Typically such structures are formed from layers of fibrous material, such as glass or graphite, impregnated with a thermosetting resin. Various other materials and lay up procedures, however, will be obvious to one skilled in the art.

The mandrels 48 and laid up material 132, are next put into molding fixture 14. If a rigid outer die is to be used, the mandrels and laid up material would first be placed in the die, then the die inserted in the molding fixture. If an inner vacuum bag is to be used, the mandrels and laid up material are first seated on the molding surface in the molding fixture, the vacuum bag is placed over the mandrels and laid up material such that they are completely enclosed, then the extension lines are put in place and the cover to the molding fixture secured.

The temperature of the reservoir 16, molding fixture 14 and recast dies 18, controlled by oven 10, is then raised to a point above the melting pont of eutectic salt 46. Since each inner cavity of the uncured component in the molding fixture is in fluid communication with the fluid inlet port, compression means 50, operable to control the hydraulic pressure of eutectic salt 46 while in the molten state, provides means for controlling the pressure exerted by mandrels 48, also molten, against the laid up material 132. To transmit hydraulic pressure from the reservoir 16 to this fluid inlet port 74 through the molten salt, fluid outlet port 79 is closed by means of valve 28.

By appropriate control of compression means 50 and oven 10, the laid up material may be cured at a desired temperature and pressure for a desired length of time. If an external vacuum bag is used, evacuation of the bag may be performed at any time prior to the gel stage of the curing process. Similarly, if an internal vacuum bag is used, pressurization of the pressure chamber and evacuation of the vacuum chamber must be accomplished before the laid up material begins to gel.

On completion of the curing process the used mandrels may be forced from the molding fixture 14 through the fluid outlet port 79 by applying pneumatic pressure to the fluid inlet port 74, since, with the component contained in the molding fixture, a fluid path may be traced, for each inner cavity in the component, from the fluid inlet port through the inner cavity to the fluid outlet port. Location of the exit openings to each cavity at the lowest point in the cavity facilitates complete removal of the mandrel.

Valve 28 allows the fluid outlet port to be fluidly connected to the recast dies 18 such that the mandrels which are forced from the molding fixture 14 will flow into the recast dies. Pneumatic pressure is applied to the fluid inlet port by means of air compressor 34 and valve 40. Additional salt to make up for traces remaining in the component may be added to the recast dies from reservoir 16 through portion 132 of fluid loop 12. Salt may be added to the loop through filler port 20, which may also serve to bleed off air from the recast dies.

Sight gauge 30 provides an indication of when the mandrels have been completely removed. At this point, shown in FIG. 1, valve 40 positioned to allow a solvent, preferably water, to be injected into the fluid inlet port through flush line 42 such that any traces of eutectic salt remaining in the inner cavities of the component after the mandrels have been forced out by pneumatic pressure may be dissolved and carried out through the fluid outlet port by the solvent. The solvent is routed out of the oven through drain line by repositioning valve 28.

After removing the completed component from the molding fixture, the entire process may be repeated, using the recast mandrels after allowing them to harden, until a desired number of components have been formed.

The foregoing descriptions, while indicative of the presently preferred embodiments, are given by way of example only, the scope of the present invention being defined by the appended claims.

What is claimed is:

1. An apparatus for forming components, each such component having one or more inner cavities, said apparatus comprising:
   a molding fixture in which the component is contained during formation, said molding fixture having a fluid inlet port so arranged that, with the component contained in the molding fixture, each inner cavity of the component is in fluid communication with the fluid inlet port;
   a reservoir in fluid communication with the fluid inlet port; and
   a quantity of eutectic salt partly contained in the reservoir and partly contained in the molding fixture in the form of a number of mandrels about which material forming the component is laid up, the number of mandrels being equal to the number of inner cavities in the component, said eutectic salt existing in either a solid or a molten state depending on its temperature, said eutectic salt in its molten state exhibiting, when compressed, a uniform hydraulic pressure over its containing surface.

2. The apparatus of claim 1 which further comprises means for controlling the temperature of the reservoir and the molding fixture such that the state of the eutectic salt may be controlled.

3. The apparatus of claim 2 which further comprises means for controlling the hydraulic pressure within the reservoir, said means for controlling pressure being operable while the eutectic salt is in the molten state, such that the pressure exerted by the mandrels against the laid up material may be controlled.

4. An apparatus for forming components, each such component having one or more inner cavities, said apparatus comprising:
   a molding fixture in which the component is contained during formation, said molding fixture having a fluid inlet port and a fluid outlet port so arranged that, with the component contained in the molding fixture, a fluid path may be traced, for each inner cavity in the component, from the fluid inlet port through the inner cavity to the fluid outlet port;
   a quantity of eutectic salt partly contained in the molding fixture in the form of a number of mandrels about which material forming the components is laid up, the number of mandrels being equal to the number of inner cavities in the component, said eutectic salt existing in either a solid or a molten state depending on its temperature, said eutectic salt in its molten state exhibiting, when compressed, a uniform hydraulic pressure over its containing surface; and
   means for applying pneumatic pressure to the fluid inlet port, such that, while the eutectic salt is in the molten sate, the mandrels will be forced from the molding fixture through the fluid outlet port.

5. The apparatus of claim 4 which further comprises:
   a reservoir in which the eutectic salt is partly contained;
   means for controlling the hydraulic pressure within the reservoir, said means for controlling hydraulic pressure being operable with the eutectic salt is in the molten state;
   means for opening or closing the fluid outlet port; and
   means for transmitting the hydraulic pressure of the eutectic salt from the reservoir to the inlet port such that the pressure exerted by the mandrels against the laid up material may be controlled while the eutectic salt is in the molten state and the fluid outlet port is closed.

6. The apparatus of claim 4 which further comprises a number of recast dies in which the mandrels are formed, the number of recast dies being equal to the number of mandrels, said recast dies being fluidly connected to the fluid outlet port such that mandrels which are forced from the molding fixture will flow into the recast dies.

7. The apparatus of claim 4 which further comprises means for injecting a solvent into the fluid inlet port such that any eutectic salt remaining in the molding fixture after the mandrels have been forced out by pneumatic pressure may be dissolved and carried out through the fluid outlet port by the solvent.

8. An apparatus for forming components, each such component having one or more inner cavities, said apparatus comprising:
   a molding fixture in which the component is contained during formation, said molding fixture having a fluid inlet port and a fluid outlet port so arranged that, with the component contained in the molding fixture, a fluid path may be traced, for each inner cavity in the component, from the fluid inlet port through the inner cavity to the fluid outlet port;

a reservoir in fluid communication with the fluid inlet port;

a quantity of eutectic salt partly contained in the reservoir and partly contained in the molding fixture in the form of a number of mandrels about which material forming the component is laid up, the number of mandrels being equal to the number of inner cavities in the component, said eutectic salt existing in either a solid or a molten state depending on its temperature, said eutectic salt in its molten state exhibiting, when compressed, a uniform hydraulic pressure over its containing surface; and means for applying pneumatic pressure to the fluid inlet port such that, while the eutectic salt is in the molten state, the mandrels will be forced from the molding fixture through the fluid outlet port.

9. The apparatus of claim 8 which further comprises a number of recast dies in which the mandrels are formed, the number of recast dies being equal to the number of of mandrels, said recast dies being fluidly connected to the fluid outlet port such that mandrels which are forced from the molding fixture will flow into the recast dies.

10. The apparatus of claim 8 which further comprises:

means for opening or closing the fluid outlet port; and means for controlling the hydraulic pressure within the reservoir, said means for controlling hydraulic pressure being operable while the eutectic salt is in the molten state such that the pressure exerted by the mandrels against the laid up material may be controlled by closing the fluid outlet port.

11. The apparatus of claim 10 which further comprises:

a number of recast dies in which the mandrels are formed, the number of recast dies being equal to the number of of mandrels, said recast dies being fluidly connected to the fluid outlet port such that mandrels which are forced from the molding fixture will flow into the recast dies.

12. An apparatus for forming components, each such component having one or more inner cavities, said apparatus comprising:

a molding fixture in which the component is contained during formation, said molding fixture having a fluid inlet port and a fluid outlet port so arranged that, with the component contained in the molding fixture, a fluid path may be traced, for each inner cavity in the component, from the fluid inlet port through the inner cavity to the fluid outlet port;

a reservoir in fluid communication with the fluid inlet port;

a quantity of eutectic salt partly contained in the reservoir and partly contained in the molding fixture in the form of a number of mandrels about which material forming the component is laid up, the number of mandrels being equal to the number of inner cavities in the component, said eutectic salt existing in either a solid or a molten state, depending on its temperature, said eutectic salt in its molten state exhibiting, when compressed, a uniform hydraulic pressure over its containing surface; and means for opening or closing the fluid outlet port;

means for controlling the hydraulic pressure within the reservoir, said means for controlling hydraulic pressure being operable while the eutectic salt is in the molten state such that the pressure exerted by the mandrels against the laid up material may be controlled by closing the fluid outlet port and opening the fluid connection between the reservoir and the fluid inlet port;

a number of recast dies in which the mandrels are formed, the number of recast dies being equal to the number of mandrels, said recast dies being fluidly connected to the fluid outlet port;

means for controlling the temperature of the reservoir, molding fixture and recast dies such that the state of the eutectic salt may be controlled; and means for applying pneumatic pressure to the fluid inlet port such that, while the eutectic salt is in the molten state, the mandrels may be forced from the molding fixture to the recast dies by opening the fluid outlet port.

13. The apparatus of claim 12 which further comprises means for injecting a solvent into the fluid inlet port such that any eutectic salt remaining in the molding fixture after the mandrels have been forced out by pneumatic pressure may be dissolved and carried out through the fluid outlet port by the solvent.

14. The apparatus of claim 12 in which the molding fixture includes a rigid outer die having a molding surface conforming to a desired outer shape of the component.

15. The apparatus of claim 14 which further comprises:

a vacuum bag enclosing the molding fixture; and means for evacuating the vacuum bag.

16. The apparatus of claim 15 in which each mandrel includes an outer layer of inert material to prevent the eutectic salt from permeating the component during formation.

17. The apparatus of claim 12 in which the molding fixture comprises:

a rigid wall having at least two pieces which may be assembled to define an airtight inner chamber;

a vacuum bag dividing the airtight inner chamber into a pressure chamber and a vacuum chamber in which the component is contained during formation, said vacuum chamber being fluidly connected to the fluid inlet and outlet ports;

means for pressurizing the pressure chamber; and means for evacuating the vacuum chamber.

18. The apparatus of claim 17 in which each mandrel includes an outer layer of inert material to prevent the eutectic salt from permeating the component during formation.

19. A method for forming a component having one or more inner cavities, said method comprising:

laying up desired thickness of material from which the component is to be formed about a number of mandrels formed from eutectic salt, the number of mandrels being equal to the number of inner cavities, each of the mandrels having a shape corresponding to a desired shape of its associated inner cavity;

putting the mandrels and laid up material into a molding fixture, said molding fixture having a fluid inlet port so arranged that, with the component contained in the molding fixture, each inner cavity of the component is in fluid communication with the fluid inlet port; and increasing the pressure of the mandrels against the laid up material by melting the mandrels and transmitting hydraulic pressure to the fluid inlet port.

20. The method of claim 19 which further comprises:
enclosing the molding fixture in a vacuum bag; and evacuating the vacuum bag;
said further steps of enclosing and evacuating being performed after putting the mandrels and laid up material into the molding fixture.

21. The method of claim 20 which further comprises wrapping the mandrels with inert material to prevent the eutectic salt from permeating the component during formation, said step of wrapping being performed prior to the laying up step.

22. The method of claim 19 in which the step of putting the mandrels and laid up material into the molding fixture comprises:
seating the mandrels and laid up material on a molding surface in the molding fixture;
placing a vacuum bag over the mandrels such that the mandrels and laid up material are completely enclosed within a vacuum chamber defined by the vacuum bag and the molding surface; and
evacuating the vacuum chamber.

23. The method of claim 22 which further comprises:
closing the molding fixture so as to define an air pressure chamber separated from the vacuum chamber by the vacuum bag; and
pressurizing the air pressure chamber.

24. The method of claim 23 which further comprises wrapping the mandrels with inert material to prevent the eutectic salt from permeating the component during formation, said step of wrapping being performed prior to the laying up step.

25. A method for forming components, each such component having one or more inner cavities, said method comprising:
wrapping a number of mandrels formed from eutectic salt with inert material, the number of mandrels being equal to the number of inner cavities, the shape of each mandrel corresponding to a desired shape of its associated inner cavity;
laying up a desired thickness of materials from which the component is to be formed about the wrapped mandrels;
putting the mandrels and laid up material into a molding fixture having a fluid inlet port and a fluid outlet port so arranged that, with the component contained in the molding fixture, a fluid path may be traced, for each inner cavity in the component, from the fluid inlet port through the inner cavity to the fluid outlet port, the fluid inlet port being connected to a reservoir containing a reserve quantity of eutectic salt, the fluid outlet port being connected to a number of recast dies for recasting the mandrels, the number of recast dies being equal to the number of inner cavities;
increasing the pressure of the mandrels against the laid up material by melting the eutectic salt in the mandrels and in the reservoir, closing the fluid outlet port, and transmitting hydraulic pressure from the reservoir to the fluid inlet port through the molten eutectic salt;
forcing the molten mandrels to flow from the molding fixture into the recast dies by opening the fluid outlet port, and then injecting air under pressure into the fluid inlet port;
removing the completed component from the molding fixture; and
repeating the preceeding steps, using the mandrels from the recast dies, until a desired number of components have been formed.

26. The method of claim 25 which further comprises removing traces of eutectic salt from the inner cavities of the completed component by injecting a solvent into the fluid inlet port.

27. The method of claim 25 which further comprises curing the laid up material at a desired temperature and pressure for a desired length of time.

28. The method of claim 27 which further comprises removing traces of eutectic salt from the inner cavities of the completed component by injecting a solvent into the fluid inlet port.

29. The method of claim 27 which further comprises:
enclosing the molding fixture in a vacuum bag; and evacuating the vacuum bag;
said further steps of enclosing and evacuating being performed prior to the step of melting the mandrels.

30. The method of claim 27 in which the step of putting the mandrels and laid up material into the molding fixture comprises:
seating the mandrels and laid up material on a molding surface in the molding fixture;
placing a vacuum bag over the mandrels such that the mandrels and laid up material are completely enclosed within a vacuum chamber defined by the vacuum bag and the molding surface; and
evacuating the vacuum chamber.

31. The method of claim 30 which further comprises:
closing the molding fixture so as to define an air pressure chamber separated from the vacuum chamber by the vacuum bag; and
pressurizing the air pressure chamber.

* * * * *